March 19, 1940.　　　H. ALLEN　　　2,194,266
NONCORROSIVE INSERT SEAT
Filed July 2, 1937　　　2 Sheets-Sheet 1
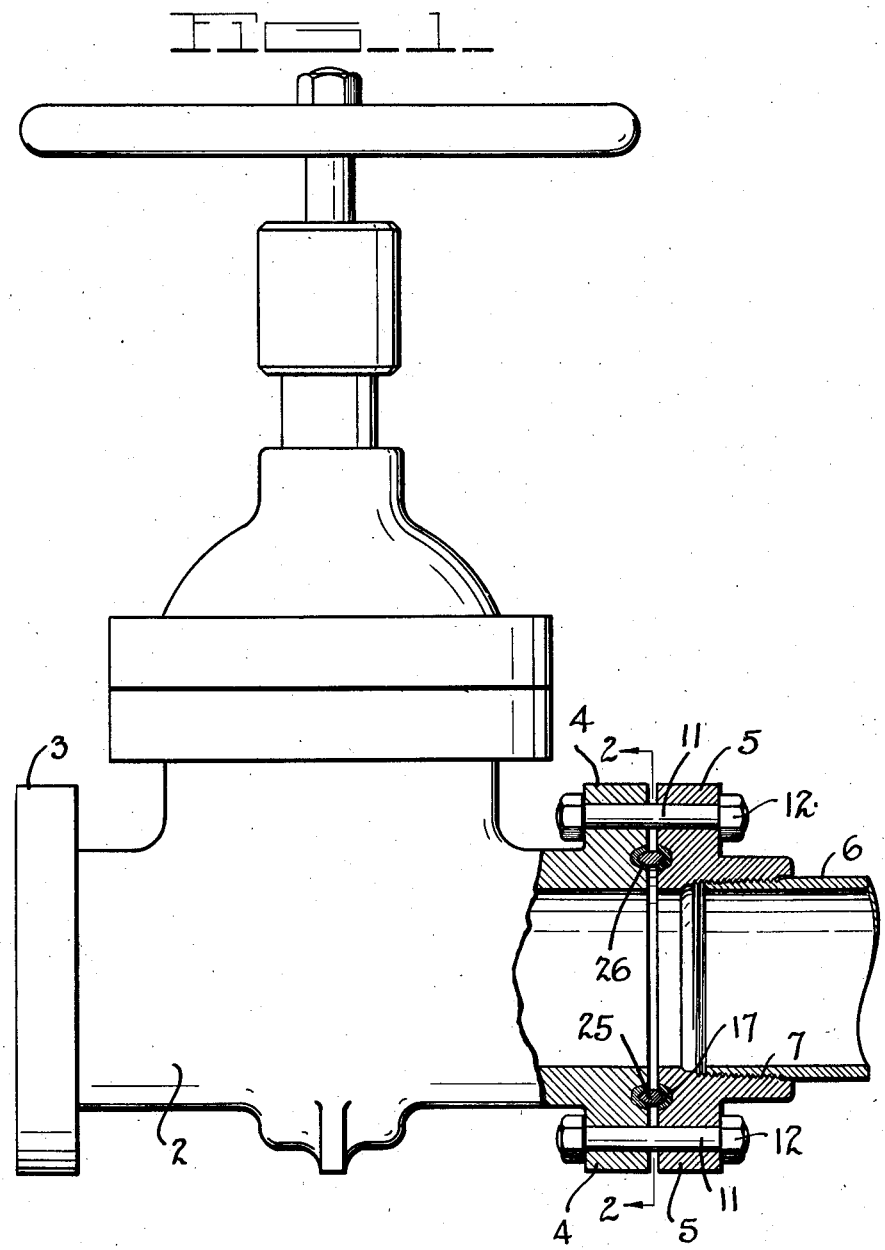
HERBERT ALLEN.
INVENTOR
BY Jesse R. Stone
Lester B Clark
ATTORNEYS.

March 19, 1940.　　　　H. ALLEN　　　　2,194,266
NONCORROSIVE INSERT SEAT
Filed July 2, 1937　　2 Sheets-Sheet 2
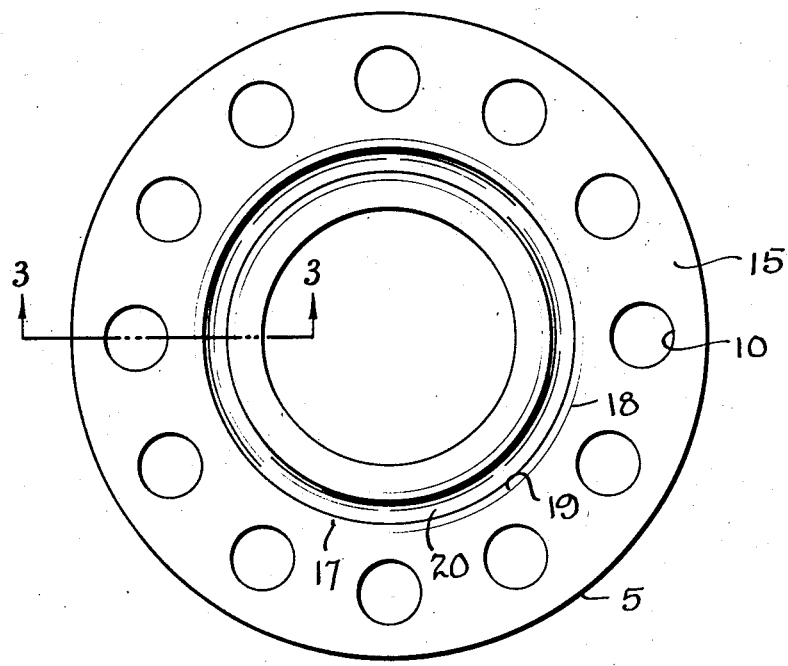
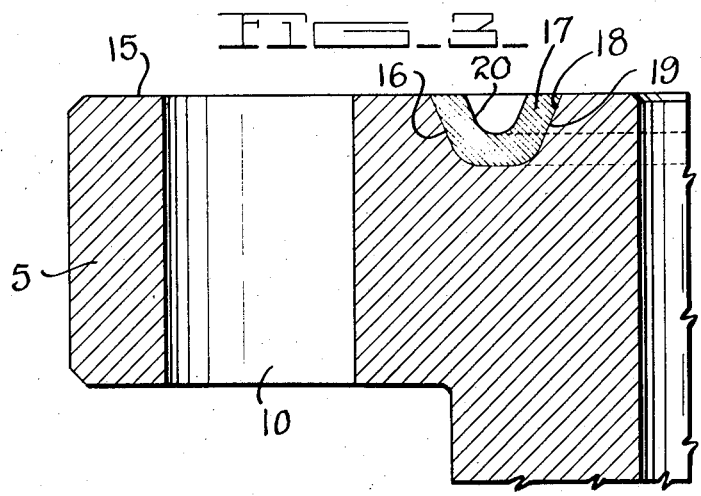
HERBERT ALLEN.
INVENTOR
ATTORNEYS.

Patented Mar. 19, 1940

2,194,266

UNITED STATES PATENT OFFICE 2,194,266

NONCORROSIVE INSERT SEAT

Herbert Allen, Houston, Tex., assignor to Cameron Iron Works, a corporation

Application July 2, 1937, Serial No. 151,659

1 Claim. (Cl. 285—130)

The invention relates to a noncorrosive seat for flanged connections.

It has been found that flanged connections for pipes, valves and couplings are more satisfactory where high pressures are to be controlled and further that couplings or connections having an insert seal ring are most satisfactory. In practice particularly in the oil fields where corrosive and abrasive materials are present and where the valves, pipes and couplings are connected and disconnected periodically, it has been found that flanged ends having grooved seats soon become corroded or damaged due to handling and exposure. In many instances the valves or flanged ends are permitted to remain exposed to the elements or are stored they are subjected to corrosion. When they are then next to be used it has been found that the seats are so corroded that a seal can not be obtained and it is then necessary to either machine a new seat in the flanged connection or to discard the piece of equipment entirely.

Of course, it is impractical to form the entire flanged member of a noncorrosive material due to the cost thereof and the present invention has therefore been devised with a view of providing a noncorrosive insert type of seat for flanged connections by removing a portion of the end face of the flange and depositing a band or ring of noncorrosive metal in this cut away groove and to thereafter form the ring seat in this band of material so that an integral noncorrosive seat is provided in the flanged end.

Another object of the invention is to provide an integral noncorrosive material seat upon a body of ferrous metal.

Still another object of the invention is to provide a noncorrosive ring and seat construction for flanged ends so that a seal may be obtained even though the coupling is connected and re-connected.

Other and further objects of the invention will be readily apparent when the following description is considered in connection with the accompanying drawings wherein;

Fig. 1 is a side elevation of a valve and pipe connection wherein certain parts are shown in section to illustrate the invention.

Fig. 2 is an end view of one of the flange faces showing the insert seat.

Fig. 3 is a section taken on the line 3—3 of Fig. 2.

In Fig. 1 a valve is illustrated at 2 which is provided with the end flanges 3 and 4. This valve may be of any desired type, size or configuration or it may be illustrative of any member having a flanged end such as 3 or 4, which is to be in turn connected to the flanged end 5 on another member 6, which may be a section of pipe. A threaded connection 7 is shown between the flanged end 5 and the pipe 6.

For purposes of illustration the flange 5 is shown enlarged in Fig. 3 and has a plurality of openings 10 therethrough which are to receive the bolts 11 so that the flanges 4 and 5 may be connected together by the bolts 12.

The end face 15 of the flange is illustrative of the end face of any flange to which the invention may be applied and, as seen in Fig. 3, this end face has been cut away to form an enlarged groove 16. This groove may be of any shape, size or configuration so long as it is arranged to receive a band or body of material 17, which is preferably of noncorrosive type. Such material may be brass, copper, stainless steel or any suitable alloy, and it may be brazed, rolled or welded in position so long as a bond is provided between the face 18 of the non-corrosive band 17 and the face 19 of the groove 16, it being imperative that a bond be formed by these two adjacent faces so that there can be absolutely no possibility of leakage between the flange 15 and the ring or band 17. After this band has been deposited a suitable ring seat 20 may be machined or otherwise formed therein.

In Fig. 1 the coupling or connection is shown as assembled with the seal ring 25 disposed in the opposed ring seats 20, one of which has been formed in each of the flanges 4 and 5. This sealing ring 25 is in the form of an annular ring whose opposite edges have been beveled at 26 on each side so as to form a tapered edged ring. When the bolts 11 are drawn up tightly of course the ring 25 is clamped in the ring seats 20 and in this manner a seal is obtained.

When the coupling is connected and disconnected it may be exposed to the weather without any damaging results to the seat member, whereas if the seat is of corrosive material and becomes corroded due to exposure, then, of course, the sealing ring will not form a perfect seal therewith when it is re-connected and resultant leakage and damage has occurred in many instances. Such a leaking connection is particularly hazardous upon oil and gas wells where pressure of four and five thousand pounds per square inch are encountered and must be controlled.

Broadly the invention contemplates a means and method of providing a simple and economical noncorrosive seat for ferrous material flanges.

What is claimed is:

In a valve casing, or pipe connection for flanged end connections wherein each end has a circular flat face and an annular groove in the material of each face adapted to receive a seal member, and means for preventing deterioration of said groove by corrosion comprising, a lining of noncorrodible material bonded to the walls of said groove.

HERBERT ALLEN.